United States Patent [19]

Muller

[11] 4,091,432

[45] May 23, 1978

[54] CONSTANT CURRENT-SOURCE WITH HIGH VOLTAGE PROTECTION, COMPLIANCE CIRCUIT

[75] Inventor: Peter Robert Muller, Lakeside, Calif.

[73] Assignee: Aiken Industries, Inc. California Instruments Division, San Diego, Calif.

[21] Appl. No.: 728,756

[22] Filed: Oct. 1, 1976

[51] Int. Cl.$^2$ .......... H02H 3/20

[52] U.S. Cl. .......... 361/56; 323/9; 361/91; 324/110

[58] Field of Search .......... 323/1, 4, 9, 19, 22 T, 323/22 Z; 324/110; 361/18, 56, 91

[56] References Cited

U.S. PATENT DOCUMENTS

| | | | |
|---|---|---|---|
| 3,234,453 | 2/1966 | Klees | 323/9 X |
| 3,304,489 | 2/1967 | Brolin et al. | 323/22 Z |
| 3,526,810 | 9/1970 | Williams et al. | 324/110 X |
| 3,571,608 | 3/1971 | Hurd | 323/9 X |
| 3,702,434 | 11/1972 | Ryan | 323/9 X |
| 3,819,983 | 6/1974 | Bjork | 323/22 T |
| 3,890,559 | 6/1975 | Kuster | 323/22 T |
| 3,979,642 | 9/1976 | Cath et al. | 323/9 X |

*Primary Examiner*—A. D. Pellinen
*Attorney, Agent, or Firm*—Brown & Martin

[57] ABSTRACT

A closed loop operational amplifier circuit for providing a constant current in the closed loop for generating a precision constant current through an unknown resistance for measuring the resultant voltage drop across the resistance. The closed loop circuit having a compliance circuit with a high voltage diode for preventing damage to a transistor in the compliance circuit in one polarity direction and a current limiting circuit including the transistor for preventing damage to the transistor from high voltage in the opposite polarity direction, and a voltage comparison circuit responsive to a high voltage in the opposite direction for reverse biasing the high voltage transistor to prevent it from entering the secondary breakdown mode.

4 Claims, 2 Drawing Figures

CONSTANT CURRENT-SOURCE WITH HIGH VOLTAGE PROTECTION, COMPLIANCE CIRCUIT

BACKGROUND OF THE INVENTION

In digital multimeters and similar circuits, the measurement of resistance is accomplished by generating a precision constant current that is sent through an unknown resistance, and then measuring the resultant voltage drop across the resistance. Protecting the constant current source against accidental application of high voltage in the closed loop circuit of the operational amplifier has been a problem in the measurement industry. In the past, the common way to protect the current source has been to current limit in one polarity and to use a reversed biased diode in the other polarity. That system has had the limitations of the secondary breakdown of the high voltage transistor in the current limit mode, where the voltage exceeded the secondary breakdown voltage of the transistor.

SUMMARY OF THE INVENTION

The present system employs the reversed biased diode for protection against high voltages in one polarity. The current limiting protection is also used to provide protection against high voltages in the opposite polarity causing secondary breakdown of the transistor in the current limit mode. For voltages at or above the secondary breakdown voltage of the high voltage transistor, a high voltage sensing and comparison circuit detects the higher voltage and reverse biases the high voltage transistor to prevent it from entering secondary voltage breakdown. Thus the circuit is protected up to the $V_{CEV}$ specification of the transistor.

In an exemplary embodiment, a reference voltage is fed to a operational amplifier that provides a constant current through a current limiting circuit to a high voltage transistor. A biasing circuit provides biasing current to the high voltage transistor. The output of the high voltage transistor is fed through a high voltage diode to the return loop circuit to the input of the operational amplifier. A test resistance is placed in the closed loop circuit. Measurement of the resistance of the test resistor is accomplished by measuring the resultant voltage drop across the resistor.

In using the digital multimeters to make such measurements of resistance, the operational problem often occurs where high voltage sources are inadvertently placed across the constant current source leads. These voltages are of sufficient magnitude to exceed the operational high voltage tolerance of the high voltage transistor. To prevent such voltages being applied to the transistor, a high voltage diode prevents the high voltage, current flow back through the high voltage transistor when the inadvertently impressed voltage is in one given polarity direction. In the opposite polarity direction, current limiting including the transistor, attempts to limit the voltage to that below the secondary breakdown of the high voltage transistor in the current limit mode. However, it often occurs that voltages higher than that which will cause secondary breakdown of the high voltage transistor, are inadvertently applied across the constant current source leads.

Thus the system in this invention uses a reverse bias diode for protection in one polarity and the current limiting protection in the other polarity direction. However such applied voltages are higher than the secondary breakdown voltage of the transistor, a comparison circuit detects this higher voltage and provides a reverse biasing in the biasing circuit to the high voltage transistor, de-energizing the transistor in the current limiting mode and thus protecting the high voltage transistor to the $V_{CEV}$ specification of the transistor. The high voltage detection and comparison circuit in one embodiment may comprise a zener diode detection circuit that provides a comparison voltage to an amplifier that in response to the higher voltage, causes the amplifier to provide an output voltage of the opposite polarity to the base of the transistor. In another embodiment, the zener diode de-energizes a switching transistor to switch from one polarity biasing to the transistor to the opposite polarity biasing that reverse biases the transistor. Thus the reverse biasing of the high voltage transistor prevents it from entering the secondary breakdown mode.

It is therefore an object of this invention to provide a new and improved precision constant current source with high voltage protection in a compliance circuit that protects the high voltage transistor in the current limit mode to a voltage protection higher than that of the secondary breakdown of the high voltage transistor.

Other objects and many advantages of this invention will become more apparent upon a reading of the following detailed description and an examination of the drawing, wherein like reference numerals designate like parts throughout and in which.

Figure 1:
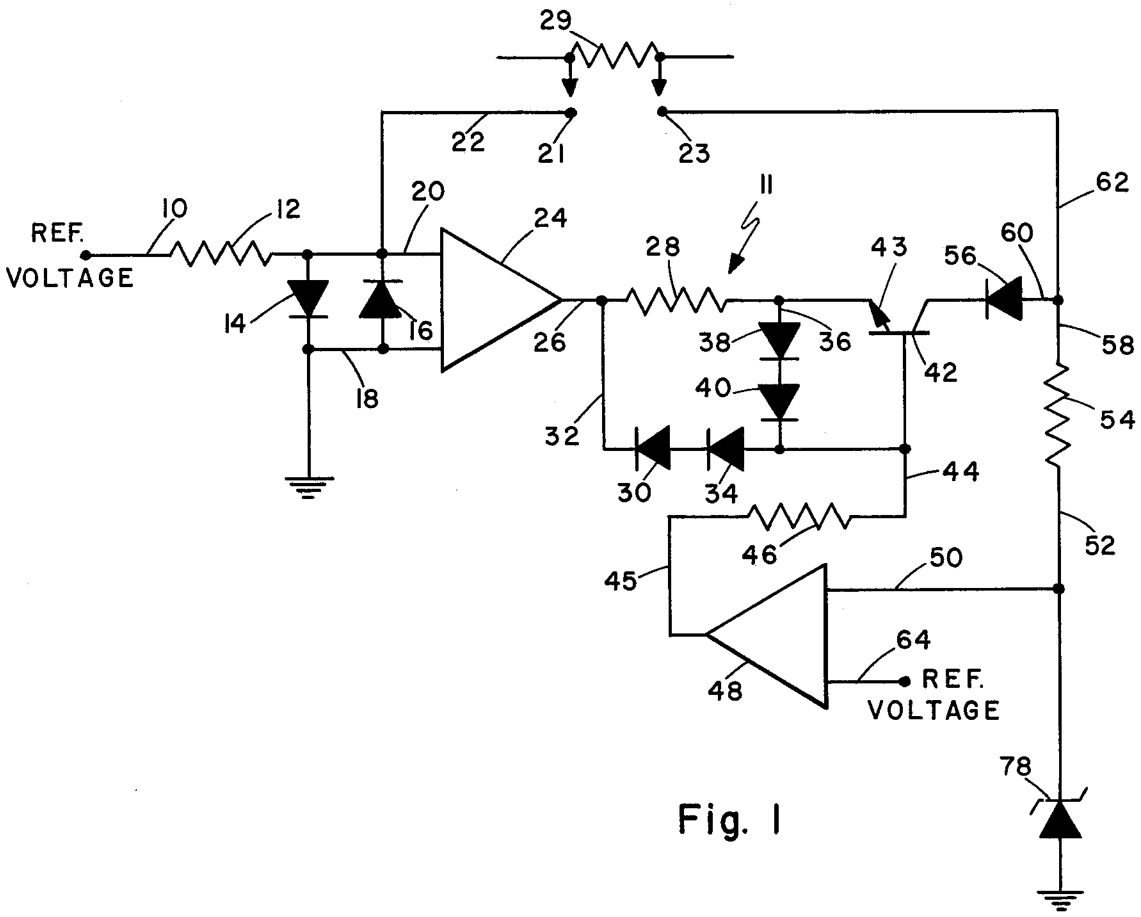
FIG. 1 is a block and schematic diagram of one embodiment of the invention.

Referring now to FIG. 1 of the drawing, the circuit provides a closed loop, constant current source across circuit connectors 21 and 23. A test resistance 29 is connected between the two connectors 21 and 23 on which the voltage drop is measured to determine the resistance of the test resistor, based upon the constant current. Such circuits are used, for example, in digital multimeters for the measurement of resistance. This is accomplished by generating a precision constant current that is sent through the unknown resistance, and then measuring the resultant voltage drop across the test resistor 29.

The problem that often occurs is that high voltages are inadvertently placed across the electrical connectors 21 and 23 of sufficient magnitude to burn out portions of the circuit, and specifically transistor 42. The same can also occur when, for instance, the resistance of an inductor is being measured and the inductor is then disconnected from the circuit in a manner creating a spark discharge into the closed loop circuit that can have a relatively high voltage.

In the circuit of FIG. 1, in normal operation, a reference voltage is fed into line 10. This reference voltage may be, for example, 10 volts D.C. A resistance 12, of for example 10 K ohms, provides a 1 MA current flow in line 20. Operational amplifier 24 provides an inverted 1 MA negative current output in line 26. This current then provides the constant current in line 62 of the loop circuit. The circuitry 11 provides a protection circuit against damage resulting from the impressing of a high voltage across connectors 21 and 23. In accomplishing this, the 1 MA current is fed through resistor 28 to transistor 42 that, when energized, passes the 1 MA current through the high voltage diode 56 and line 62 across the test resistor 29 connected to connectors 21 and 23, and through line 22 back to line 20. In the closed loop constant current operation, the voltage in line 62 is that voltage equal to the voltage drop across the test resistor 29. Circuit 11 functions as a compliance circuit to accomplish this.

Thus in the closed, stabilized operation, the voltage in line 20 is essentially a zero voltage. Resistor 28 and diodes 30 and 34 function as current limiters. A 2 volt reference voltage in line 64 is sufficient, relative to the normal voltage in line 50, to provide a positive voltage output from the amplifier 48 through line 45, resistor 46 and line 44 to provide sufficient base drive for energizing transistor 42. During this normal operation, the negative voltage in line 58 is such that a small, negligible current flow through resistor 54 and through a 0.7 volt drop across the zener diode 78 in the normal diode current direction. Thus, the 0.7 positive volt drop on the negative input to the operational amplifier 48, that functions as a comparator circuit, is lower than the 2 volts reference voltage and thus the positive base drive to transistor 42 is maintained.

In the situation where, for example, a high voltage in the order of 1,000 volts is inadvertently impressed across test connectors 21 and 23; a high voltage condition depending on the polarities may be created that will burn out transistor 42. Where the voltage drop across connectors 21 and 23 is of the same D.C. polarity as in the normal operation of the closed loop circuit, then the high negative voltage in line 62 is blocked by the turned off high voltage diode 56. Further the high positive voltage on the input to operational amplifier 24 is limited by diode 14. Thus the high voltage is not impressed across transistor 42 and the circuit is protected.

However, when the high voltage has a reverse polarity, that is the voltage at connector 21 is negative and at connector 23 is positive, then a high positive voltage is placed across the energized high voltage diode 56. This diode is energized and allows the current to pass through the protection circuit and through transistor 42. In this mode, the negative voltage in line 22 creates a 0.7 volt drop across diode 16 to ground. This references the high voltage to the common. This provides a negative relatively high current in line 26 and through resistor 28 to the transistor 42. Thus the high voltage is impressed across transistor 42, which is energized in an operational mode. As previously described, transistor 42 in the energized condition may operate under 700 volts. Any higher voltage will force the transistor 42 into the secondary breakdown mode that will burn out the transistor 42. However when transistor 42 is turned off or de-energized, then transistor 42 may be able to block 1400 volts or higher volts, depending on the $V_{CEV}$ specification of the transistor 42. However to do this, transistor 42 has to be de-energized or turned off. This is accomplished by reverse biasing that prevents the transistor 42 from entering the secondary breakdown mode.

Thus when the high voltage is inadvertently applied across the test connectors 21 and 23, this places a high positive voltage in line 62. This causes a current flow through line 58, resistor 54 and line 52 and in a reverse direction through the zener diode 78. The zener diode 78 limits this reverse voltage at about 25 volts. Thus the voltage in line 52 is held a positive 25 volts. This positive 25 volts is fed through line 50 to the negative input to the operational amplifier 48, which voltage is compared with the positive 2 volts reference voltage on the positive input line 64 to the amplifier 48. Since the negative input voltage far exceeds the positive reference voltage, the open loop operational amplifier circuit feeds a negative output voltage to line 45 that is fed through resistor 46 and line 44 to the base of transistor 42. This negative drive current de-energizes transistor 42 by reverse biasing. When transistor 42 is turned off, it is not destroyed by the inadvertently applied high voltage.

During the initial momentary application of the high voltage to the circuit, there is a momentary time lag in the operation of amplifier 48. Thus transistor 42 and the junction 43 are subject to being destroyed. The current limiting diodes 30 and 34 in conjunction with resistor 28 limits the current flow through transistor 42 until amplifier 48 has time to operate.

In normal operation of the circuit, operational amplifier 48 functions as a comparator and provides the difference, positive voltage drive to transistor 42 for normal compliance circuit operation in the precision constant current circuit. When a high voltage or inductor induced high voltage is applied across connectors 23 and 21 in the negative to positive normal current flow, then high voltage diode 56 protects the circuit. However when a reverse polarity high voltage is applied to the circuit, which would normally exceed the current limiting ability of the transistor 42, then the protect circuit of the operational amplifier 48 operating as a comparator circuit, provides a negative reverse bias voltage to transistor 42 placing the transistor 42 in the shut off condition where it can withstand the high voltage. Diodes 38 and 40 prevent excessive reverse bias on the base collector junction of transistor 42, which could destroy junction 43.

Figure 2:
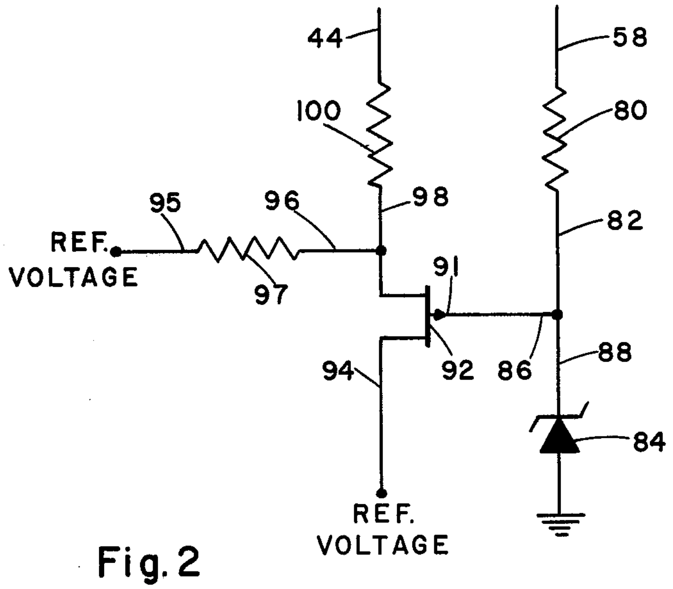
FIG. 2 is a schematic diagram of a modified embodiment of the reverse bias protection circuit, as applied to the embodiment of FIG. 1.

In the modified embodiment of FIG. 2, the amplifier 48 acting as a comparator is replaced by a P channel transistor 92, that is connected across a minus 15 volt reference voltage in line 95 and a positive 15 volt reference voltage in line 94. In this embodiment, when the input voltage in line 58 is sufficient to cause the zener diode 84 to be turned on under reverse current, then this places approximately 20 to 25 volts positive current on line 86. This creates a positive voltage condition on the P channel transistor 92 in line 91 that is sufficient to turn off the P channel transistor 92.

In normal operation of the circuit, P channel transistor 92 functions as a closed switch between lines 94 and 98 providing positive drive current to the transistor 42 through resistor 100 and line 44. However when P channel transistor 92 is turned off, it becomes an open circuit and the negative reference voltage is fed through line 95, resistor 97, line 96, line 98, resistor 100 and line 44 to the transistor 42, de-energizing the transistor. Thus any time the positive voltage in line 82 exceeds the 25 volt operating level of the zener diode 84, then transistor 42 is de-energized by negative reverse bias. In normal operation of the circuit, there are no range of operation wherein the positive voltage in line 58 in normal operation would ever exceed the minimum voltages requires in line 52 or 82 to de-energize transistor 42.

Having described my invention, I now claim:

1. In a closed loop operational amplifier circuit for providing a constant current in the closed loop for generating a precision constant current through an unknown resistance for enabling the value of the resistance to be determined by measuring the resultant voltage drop across the resistance, a circuit for protecting the operational amplifier circuit from a high voltage that is externally applied across the operational amplifier circuit, comprising a transistor switch for enabling current flow through the closed loop;

a biasing circuit for biasing the transistor switch to control current flow through the transistor switch;

current limiting means for limiting the magnitude of the current through the transistor switch;

high voltage diode means connected to the output of the transistor switch for preventing externally applied high voltage induced current flow in a given polarity direction through the transistor switch; and means coupled to the biasing circuit and responsive to an externally applied high voltage induced current flow in the opposite polarity direction for causing the biasing circuit to reverse bias the transistor switch to inhibit current flow through the closed loop.

2. A protection circuit according to claim 1, further comprising means connected to the transistor switch for preventing excessive reverse biasing of the transistor switch.

3. A protection circuit according to claim 1, wherein the biasing means comprises a comparator for forward biasing the transistor switch when the voltage at a first voltage input of the comparator does not exceed the voltage at a reference voltage input of the comparator, and for reverse biasing the transistor switch when the voltage at the first voltage input exceeds the voltage at the reference voltage input; and the means coupled to the biasing means comprise a resistance coupled to the first voltage input for enabling a portion of externally applied high voltage to be provided to the first voltage input of the comparator; and a circuit means connected to the first voltage input for limiting the voltage provided to the first voltage input for protecting the comparator.

4. A protection circuit according to claim 3, wherein the comparator comprises a gated transistor switch in which the gate is the first voltage input, one channel is the reference voltage input and the other channel is coupled to the first mentioned transistor switch, wherein the one channel is coupled to a first voltage source for forward biasing the first mentioned transistor switch and the other channel is coupled to a second voltage source for reverse biasing the first mentioned transistor switch, whereby when the gated transistor switch is in a conducting mode, the first transistor switch is forward biased and conducts current through the closed loop, and when the gated transistor switch is in a non-conducting mode, the first transistor switch is reverse biased to inhibit current flow through the closed loop.

* * * * *